July 20, 1954      R. HENRY      2,684,099

WHEEL CONSTRUCTION

Filed May 24, 1952

INVENTOR.
RAYMOND HENRY
BY

ATTORNEY

Patented July 20, 1954

2,684,099

UNITED STATES PATENT OFFICE 2,684,099

WHEEL CONSTRUCTION

Raymond Henry, Moline, Ill.

Application May 24, 1952, Serial No. 289,752

2 Claims. (Cl. 152—7)

The present invention relates to improvements in wagon wheels and particularly to a structure which does not require a stay wire running through the tire, as is now common practice in the making of wheels having rubber tires or rims. Also, it is an object of the present invention to provide a wheel which is so constructed that it is cheap enough that the user may throw away the entire wheel and replace it with a new one in event the tire wears down to the point that repair seems essential. It is also an object of this invention to produce a unitary construction of tire, hub, and disk so that the structure will be strong and will withstand the strains put upon a wagon wheel.

In the drawings annexed hereto and forming a part hereof,

This wheel is preferably made of rubber of different consistencies, from the center to the outer surface thereof. At the center of the wheel, the hub 1 is preferably made of substantially hard rubber which may be provided with a bearing unit, or not, as preferred by the manufacturer.

This bearing unit may be a bronze sleeve, a pin or needle bearing, or the hub 1 may be impregnated with graphite or any other type of friction-reducing bearing.

Figure 2:
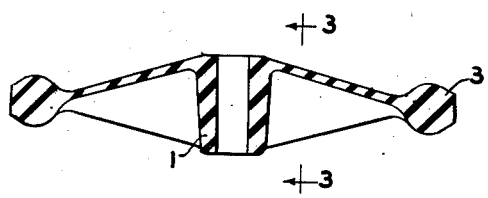
Fig. 2 represents a section taken on the plane indicated by the line 2—2, in Fig. 1.
Figure 1:
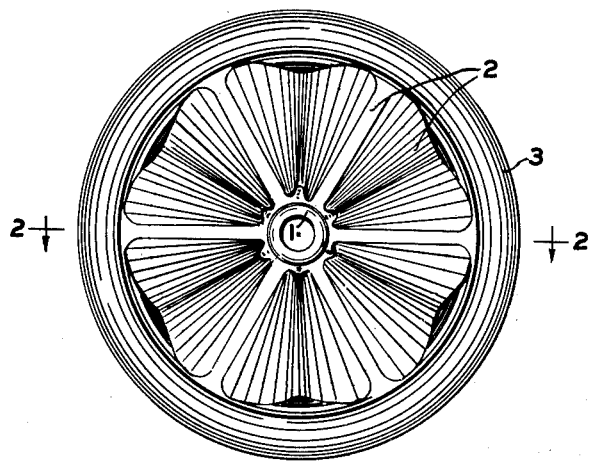
Fig. 1 represents a side elevation of a wheel of this invention.
Figure 3:
Fig. 3 is a development of Fig. 1 along the line 3—3 in Fig. 2.

The corrugations 2 are made integral with the hub 1 and the rim or tire 3, and they serve the purpose of spokes in keeping the rim rigid and preventing any substantial bending thereof. These corrugations are deep near the hub, as shown in Fig. 2, and more shallow near the rim, giving the wheel the effect of spokes extending out from the hub, and of being stronger near the hub where the greatest strain occurs. These corrugations extend substantially from end to end of the hub, giving lateral stability to the wheel.

Having now described my invention, I claim:

1. A wheel of integral construction comprising a substantially cylindrical hub section, a transversely rounded rim section, and a web section joined integrally to the peripheral portion of the hub section and to the rim section and comprising a plurality of approximately sinusoidal corrugations extending radially outwardly from the periphery of the cylindrical hub and having a depth, next to the hub section, that is substantially equal to the length of the hub section, said corrugations decreasing in depth uniformly toward the rim section, the depth of the corrugations immediately adjacent the inner side of the rim section being appreciably less than the width of the rim section, said corrugations being joined integrally to the inner face of the rim section and faired thereinto so that the thickness of the web section at the rim section is greater than the thickness of the deeper corrugated portions of the web section, the rim section being yieldable in use.

2. A wheel construction as defined in claim 1, further characterized by being formed of rubber of different consistencies, being harder at the hub section and decreasing in hardness toward the rim section.

References Cited in the file of this patent

UNITED STATES PATENTS

| Number | Name | Date |
|---|---|---|
| 970,126 | Scullin | Sept. 13, 1910 |
| 1,398,614 | Williams | Nov. 29, 1921 |
| 1,432,540 | Deister | Oct. 17, 1922 |
| 2,605,592 | Cosmos | Aug. 5, 1952 |

FOREIGN PATENTS

| Number | Country | Date |
|---|---|---|
| 249,503 | Great Britain | 1926 |